United States Patent
Seok

(10) Patent No.: US 9,877,276 B2
(45) Date of Patent: *Jan. 23, 2018

(54) METHOD AND APPARATUS FOR TRANSMITTING AND RECEIVING POWER SAVE-POLLING FRAME AND RESPONSE FRAME IN WIRELESS LAN SYSTEM

(71) Applicant: LG ELECTRONICS INC., Seoul (KR)

(72) Inventor: Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,453

(22) Filed: Mar. 2, 2015

(65) Prior Publication Data
US 2015/0173012 A1 Jun. 18, 2015

Related U.S. Application Data

(63) Continuation of application No. 14/232,956, filed as application No. PCT/KR2013/007939 on Sep. 3, 2013.

(Continued)

(51) Int. Cl.
*H04L 12/24* (2006.01)
*H04W 52/02* (2009.01)
(Continued)

(52) U.S. Cl.
CPC ..... *H04W 52/0206* (2013.01); *H04L 41/0613* (2013.01); *H04W 52/0216* (2013.01);
(Continued)

(58) Field of Classification Search
CPC ..... H04W 84/12; H04W 74/06; H04W 63/02; H04W 68/00; H04W 72/02;
(Continued)

(56) References Cited

U.S. PATENT DOCUMENTS

2005/0152373 A1 7/2005 Ali
2008/0293444 A1* 11/2008 Furuskar ............ H04W 52/265
455/522

(Continued)

FOREIGN PATENT DOCUMENTS

JP 2012-134693 A 7/2012
KR 10-2011-0102258 A 9/2011
(Continued)

OTHER PUBLICATIONS

International Search Report issued in corresponding International Patent Application No. PCT/KR2013/007939 dated Dec. 23, 2013.
(Continued)

*Primary Examiner* — Salvador E Rivas
(74) *Attorney, Agent, or Firm* — Morgan, Lewis & Bockius LLP

(57) ABSTRACT

A method and apparatus for transmitting and receiving a power save-polling (PS-Poll) frame and response frame in a wireless LAN (WLAN) system are disclosed. The method for transmitting a frame by a station (STA) in a wireless LAN (WLAN) system includes awakening at a predetermined time, and transmitting a Power Save (PS)-Poll frame to an access point (AP); and receiving information in response to the PS-Poll frame from the access point (AP), wherein information indicating an access category (AC) of the PS-Poll frame is provided from the access point (AP) to the station (STA).

10 Claims, 15 Drawing Sheets

Related U.S. Application Data

(60) Provisional application No. 61/735,561, filed on Dec. 11, 2012, provisional application No. 61/735,070, filed on Dec. 10, 2012, provisional application No. 61/696,282, filed on Sep. 3, 2012.

(51) Int. Cl.
  *H04W 74/06* (2009.01)
  *H04W 84/12* (2009.01)

(52) U.S. Cl.
  CPC ............ *H04W 74/06* (2013.01); *H04W 84/12* (2013.01); *H04W 52/0235* (2013.01); *Y02B 60/50* (2013.01)

(58) Field of Classification Search
  CPC ............ H04W 74/002; H04W 28/044; H04W 74/085; H04B 7/15; H04B 10/22; H04B 7/00; H04L 5/0058; H04L 47/27; H04L 41/0613
  See application file for complete search history.

(56) References Cited

U.S. PATENT DOCUMENTS

| | | | |
|---|---|---|---|
| 2010/0189024 A1* | 7/2010 | Xhafa | H04W 76/048 370/311 |
| 2010/0271995 A1* | 10/2010 | Seok | H04W 52/0216 370/311 |
| 2012/0250596 A1* | 10/2012 | Park | H04W 52/0219 370/311 |
| 2013/0010664 A1 | 1/2013 | Kang et al. | |
| 2013/0128798 A1* | 5/2013 | Liu | H04W 48/12 370/312 |
| 2013/0223419 A1 | 8/2013 | Ghosh et al. | |
| 2013/0229959 A1* | 9/2013 | Ghosh | H04W 74/08 370/311 |
| 2014/0056163 A1 | 2/2014 | Kwon et al. | |
| 2015/0036572 A1* | 2/2015 | Seok | 370/311 |

FOREIGN PATENT DOCUMENTS

| | | |
|---|---|---|
| KR | 10-2012-0094002 A | 8/2012 |
| WO | 2012/033379 A2 | 3/2012 |
| WO | 2012/046951 A1 | 4/2012 |

OTHER PUBLICATIONS

International Search Report and Writen Opinion dated Dec. 23, 2013, issued by the International Searching Authority in International Patent Application No. PCT/KR2013/007939.

U.S. Office Action dated Jul. 15, 2015, in U.S. Appl. No. 14/232,956.

German Office Action dated Jul. 25, 2017, issued in corresponding German Application No. 11 2013 000 133.

* cited by examiner

FIG. 16

| Element ID | Length | PS-Poll Access Category |
|---|---|---|
| 1 octet | 1 octet | 1 octet |

(a)

| Element ID | Length | PS-Poll Access Category | Duration | Interval |
|---|---|---|---|---|
| 1 octet | 1 octet | 1 octet | 1 octet | 1 octet |

(b)

FIG. 17
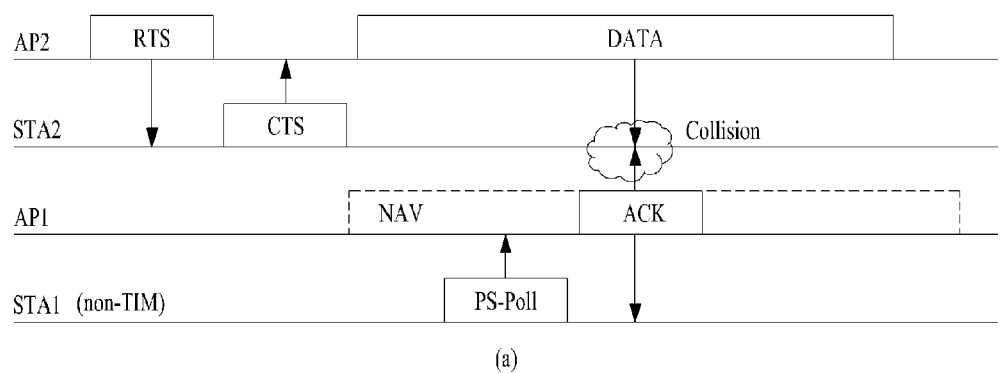
(a)
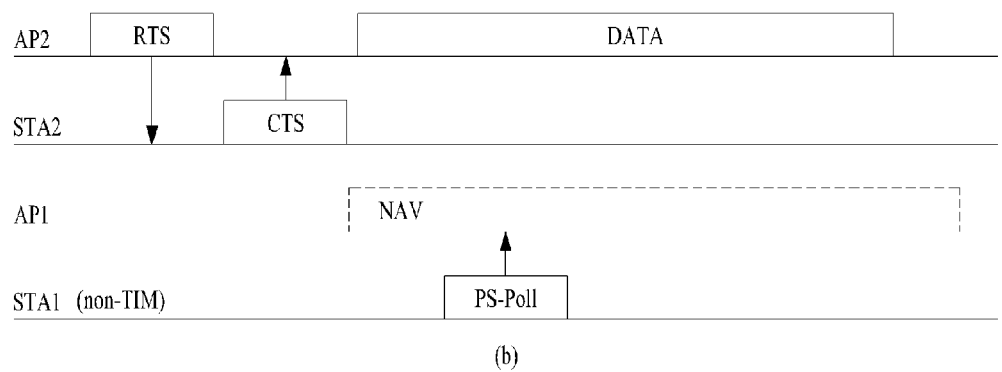
(b)

FIG. 18
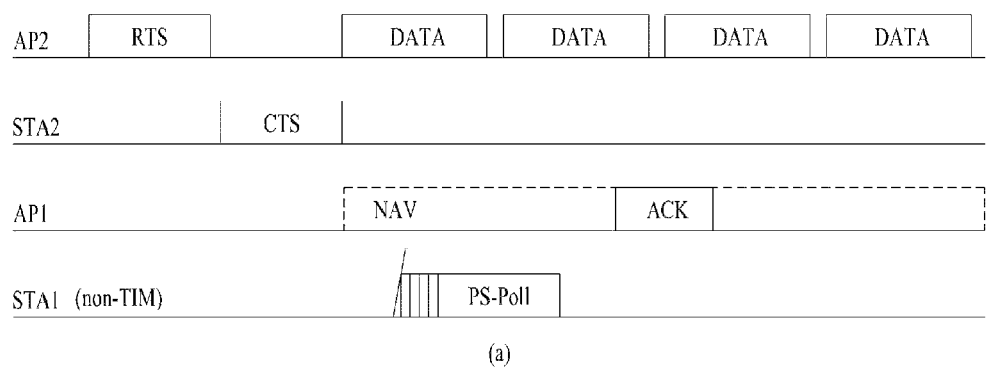
(a)
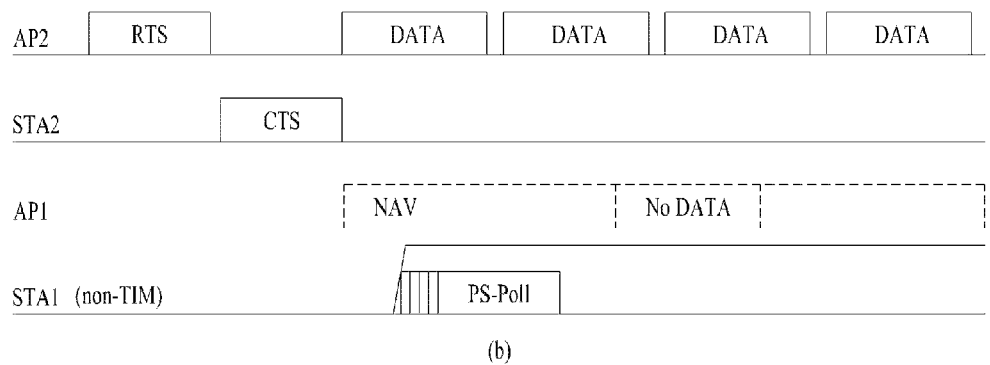
(b)

METHOD AND APPARATUS FOR TRANSMITTING AND RECEIVING POWER SAVE-POLLING FRAME AND RESPONSE FRAME IN WIRELESS LAN SYSTEM

CROSS REFERENCE TO RELATED APPLICATIONS

The present application is a continuation of U.S. patent application Ser. No. 14/232,956, filed on Jan. 15, 2014, the entire disclosure of which is hereby incorporated by reference for all purposes as if fully set forth herein. U.S. patent application Ser. No. 14/232,956 is a U.S. National Stage Entry of PCT International Application No. PCT/KR2013/007939, filed on Sep. 3, 2013, and claims the benefit of U.S. Provisional Application No. 61/735,561, filed on Dec. 11, 2012; No. 61/735,070, filed on Dec. 10, 2012; and No. 61/696,282, filed on Sep. 3, 2012.

TECHNICAL FIELD

The present invention relates to a wireless communication system, and more particularly to a method and apparatus for transmitting and receiving power save-polling frame and response frame in a wireless LAN (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, Institute of Electrical and Electronics Engineers (IEEE) 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

Machine to Machine (M2M) communication technology has been discussed as next generation communication technology. A technical standard for supporting M2M communication in IEEE 802.11 WLAN has been developed as IEEE 802.11ah. M2M communication may consider a scenario capable of communicating a small amount of data infrequently at low speed in an environment including a large number of devices.

Since stations (STAs) for use in a WLAN system can competitively access a wireless medium, access priority or an access category may be established to provide a predetermined service quality. In order to prevent collision of a polling message (for example, PS-Poll frame) sent to an access point (AP) in a power saving mode of the legacy WLAN system, a low-priority access category is used.

Differently from the PS-Poll frame transmission operation of the legacy STA, if STAs (for example, non-TIM STAs) capable of transmitting the PS-Poll frame without confirming a traffic indication map (TIM) are introduced, applying the legacy access category without change may encounter the problem of increasing STA power consumption.

The present invention provides a method for establishing a separate access category for transmission of the PS-Poll frame of the STA, preventing increase in power consumption of the STA, and at the same time increasing the efficiency of channel access through the PS-Poll frame.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a frame by a station (STA) in a wireless LAN (WLAN) system including: awakening at a predetermined time, and transmitting a Power Save (PS)-Poll frame to an access point (AP); and receiving information in response to the PS-Poll frame from the access point (AP), wherein information indicating an access category (AC) of the PS-Poll frame is provided from the access point (AP) to the station (STA).

In accordance with another aspect of the present invention, a method for supporting frame transmission by an access point (AP) in a wireless LAN (WLAN) system includes: receiving, by an access point (AP), a Power Save (PS)-Poll frame from the station (STA) awoken at a predetermined time; and transmitting information in response to the PS-Poll frame from the access point (AP) to the station (STA), wherein information indicating an access category (AC) of the PS-Poll frame is provided from the access point (AP) to the station (STA).

In accordance with another aspect of the present invention, a station (STA) device for transmitting a frame in a wireless LAN (WLAN) system includes: a transceiver; and a processor, wherein the processor is configured to awake at a predetermined time, transmit a Power Save (PS)-Poll frame to an access point (AP) using the transceiver, and receive information in response to the PS-Poll frame from the access point (AP) using the transceiver, wherein information indicating an access category (AC) of the PS-Poll frame is provided from the access point (AP) to the station (STA).

In accordance with another aspect of the present invention, an access point (AP) device for supporting frame transmission of a station (STA) in a wireless LAN (WLAN) system includes: a transceiver; and a processor, and the processor is configured to receive a Power Save (PS)-Poll frame from the station (STA) awoken at a predetermined time using the transceiver, and transmit information in response to the PS-Poll frame to the station (STA) using the transceiver, wherein information indicating an access category (AC) of the PS-Poll frame is provided from the access point (AP) to the station (STA).

The following description may be commonly applied to the embodiments of the present invention.

The information indicating the access category (AC) may be a PS-Poll AC field.

The PS-Poll AC field may be used when the access point (AP) informs the STA of an access category (AC) for the PS-Poll transmission.

The PS-Poll AC field may be contained in a beacon frame.

The PS-Poll AC field may be 2 bits long.

The PS-Poll frame may be transmitted using an access category (AC) based on a specific value set by the PS-Poll AC field.

If the information indicating the access category (AC) of the PS-Poll frame is not provided to the STA, the PS-Poll frame may be transmitted using an access category (AC) set as a default value.

The PS-Poll frame may be transmitted using an access category AC_VO (Access Category_Voice).

The predetermined time may be allocated by the access point (AP).

The station (STA) may be a non-TIM STA.

Transmission of the station (STA) may be allowed only within a Restricted Access Window (RAW) period allocated by the access point (AP).

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention may allow a device operating in a WLAN system to correctly perform/support efficient sub-channel selective access.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 16 is a structural diagram illustrating an Information Element (IE) used for establishing the PS-Poll AC according to the present invention.

FIG. 17 is a conceptual diagram illustrating a PS-Poll response method according to one example of the present invention.

FIG. 18 is a conceptual diagram illustrating a PS-Poll response method according to another example of the present invention.

BEST MODE

Figure 1:
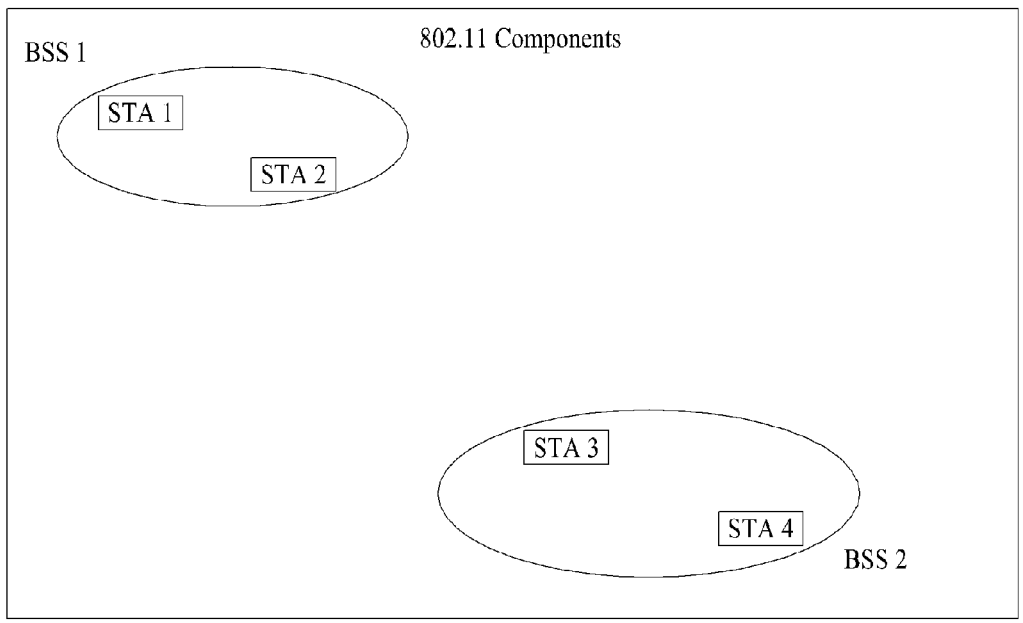
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
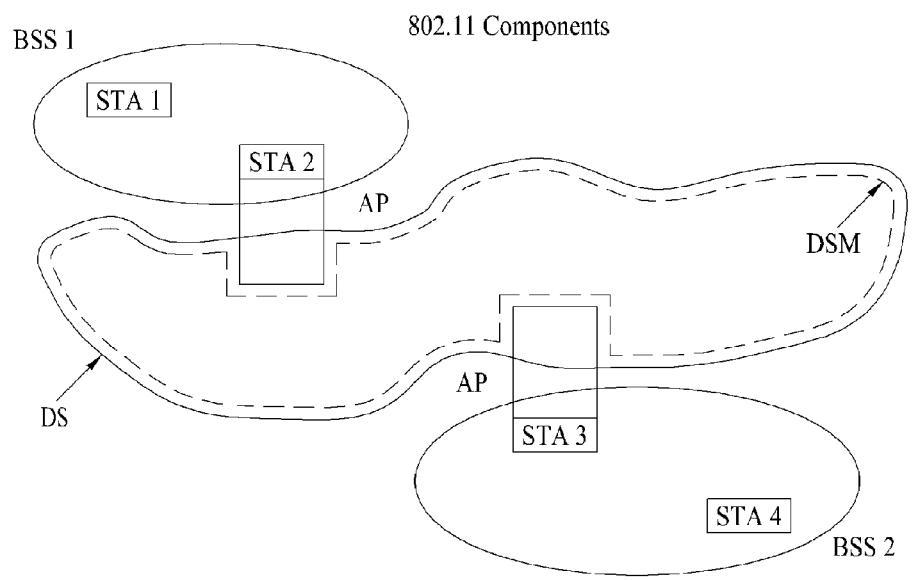
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
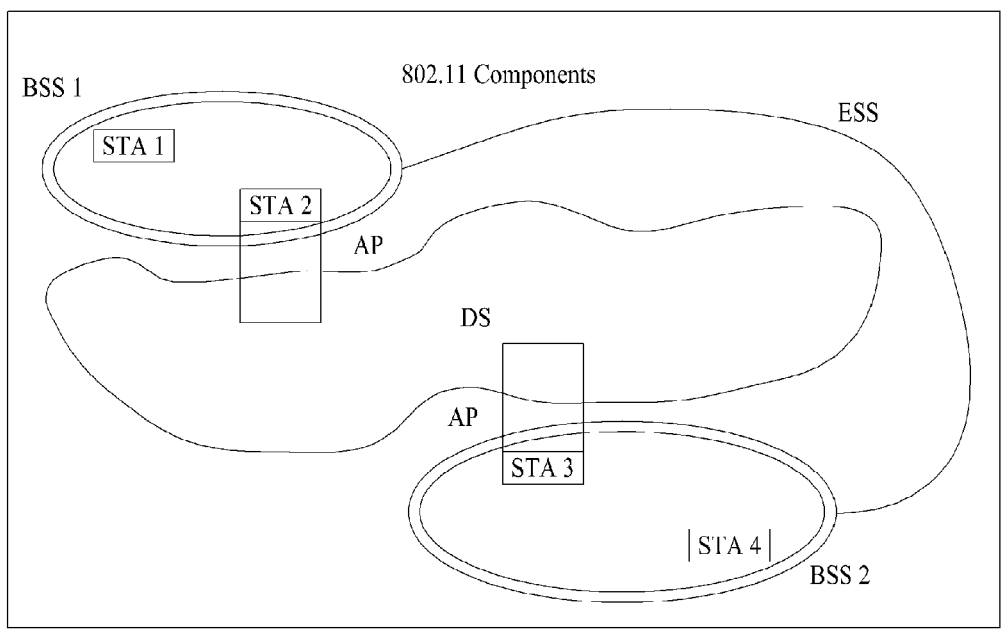
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
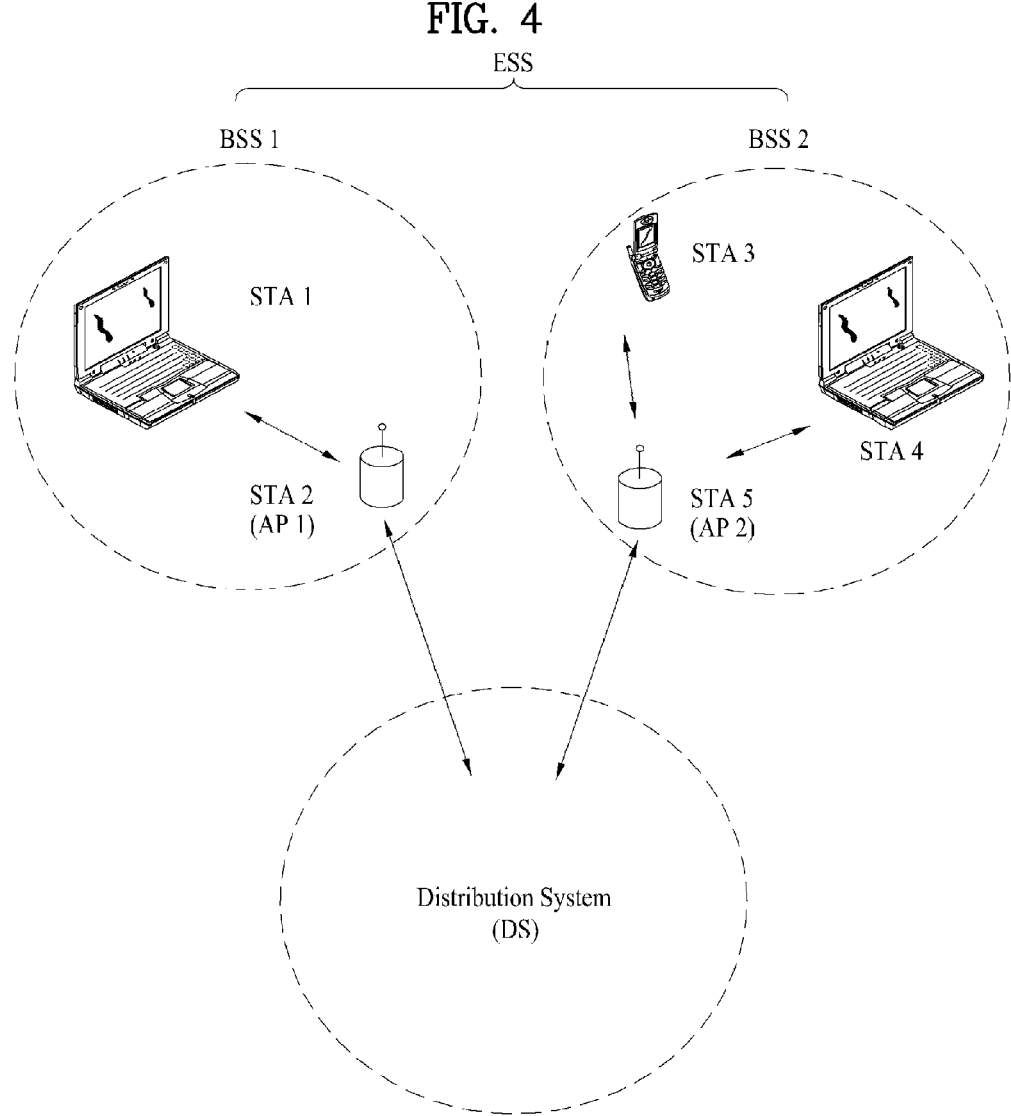
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
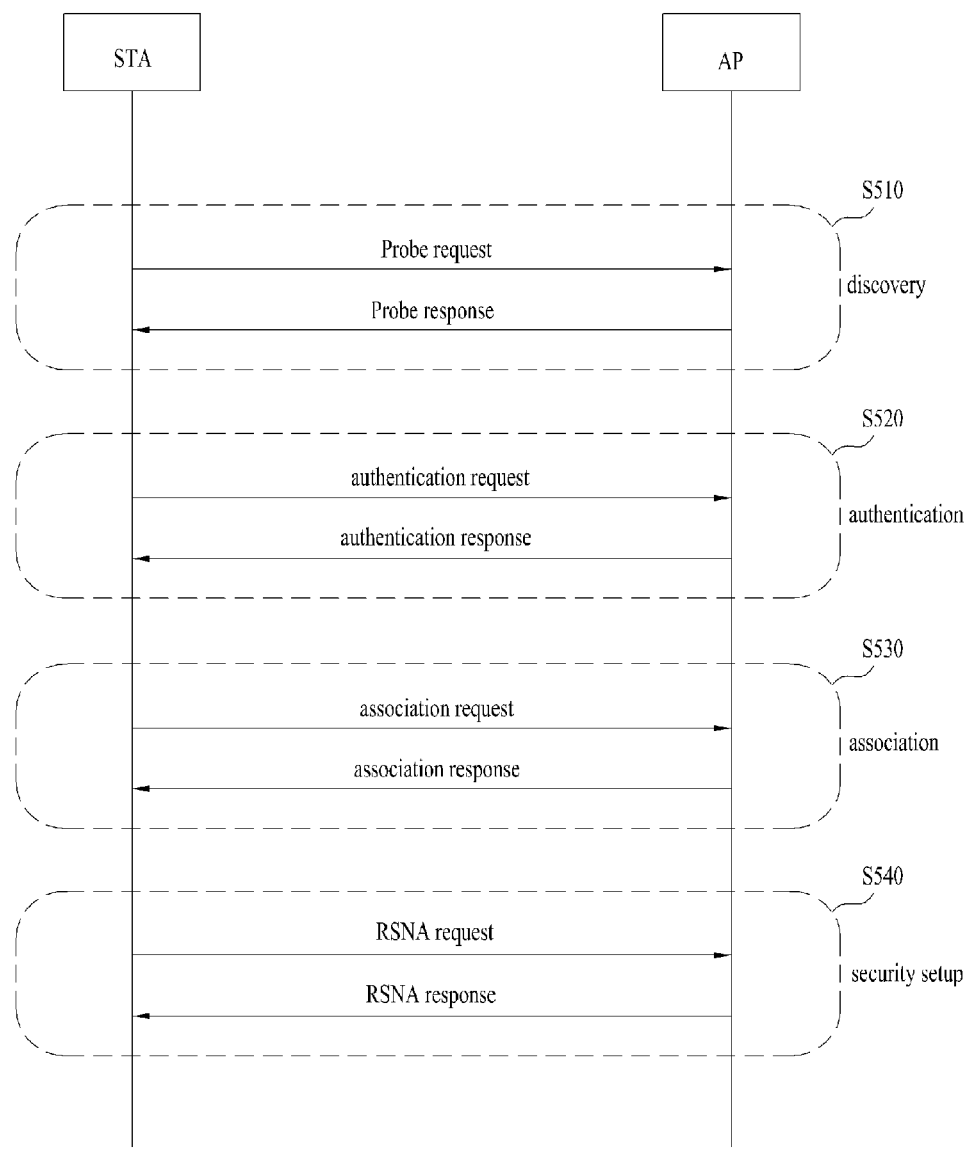
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2 D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11—based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
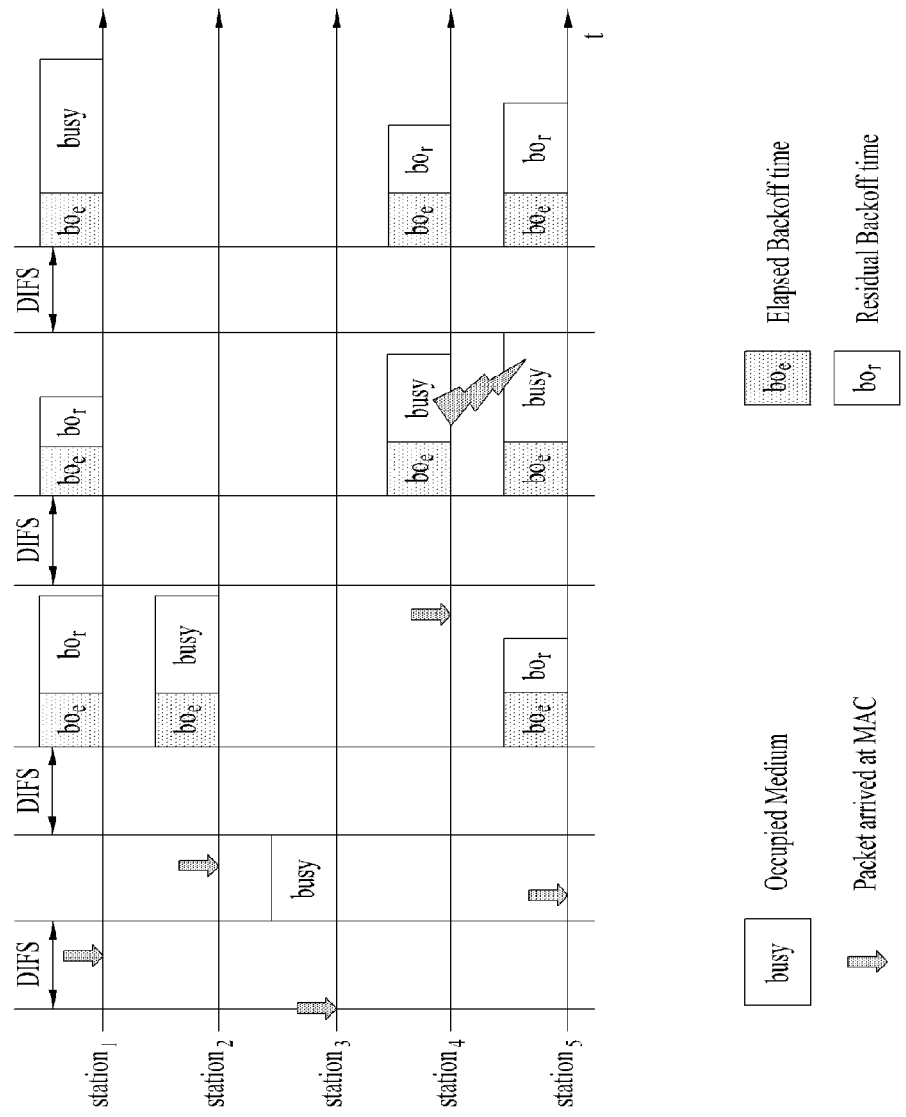
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a packet number, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value is prohibited for medium access during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
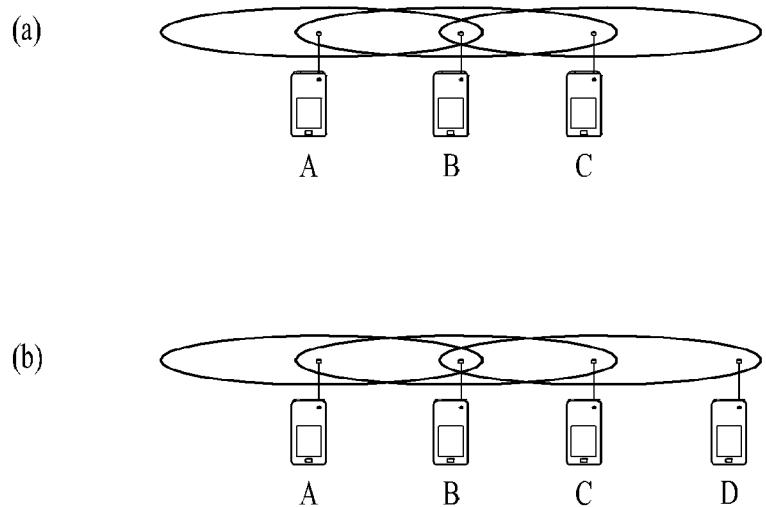
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
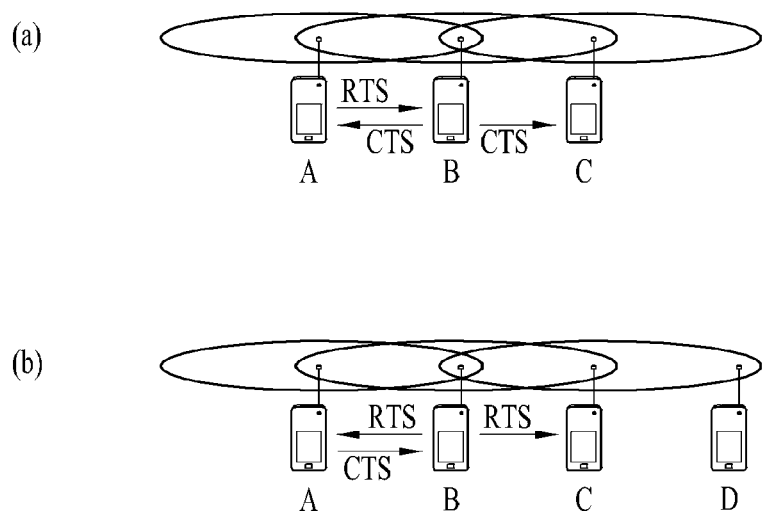
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
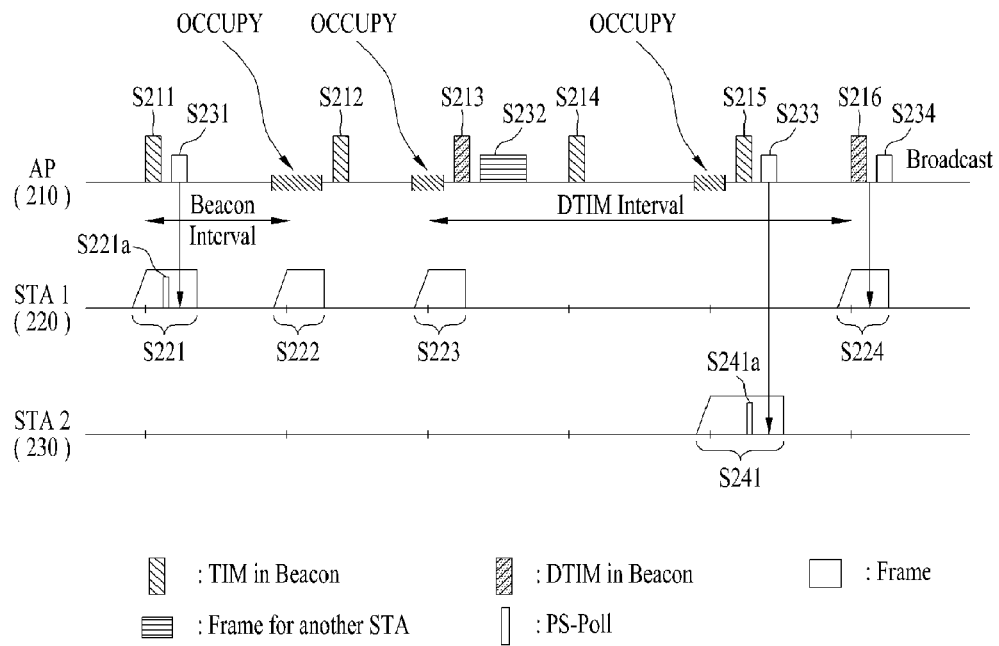
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA 1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
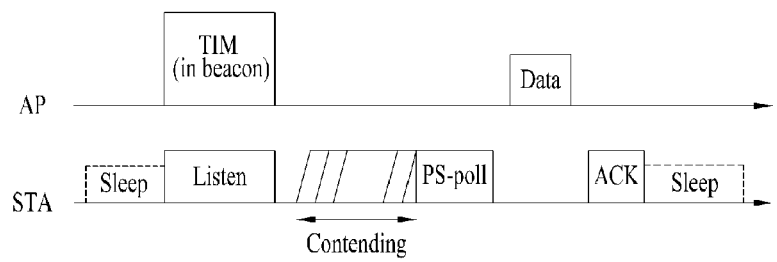
FIGS. 10 to 12 are conceptual diagrams illustrating operations of an STA having received a TIM.
Figure 11:
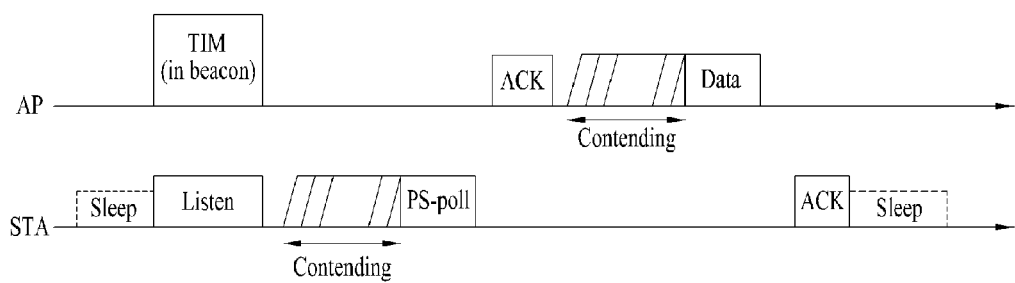
Figure 12:
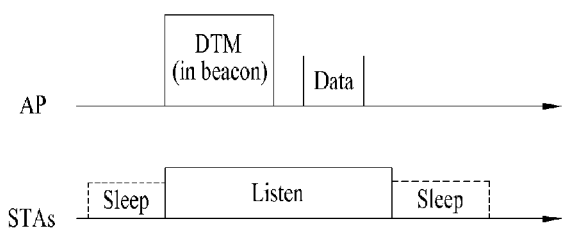

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
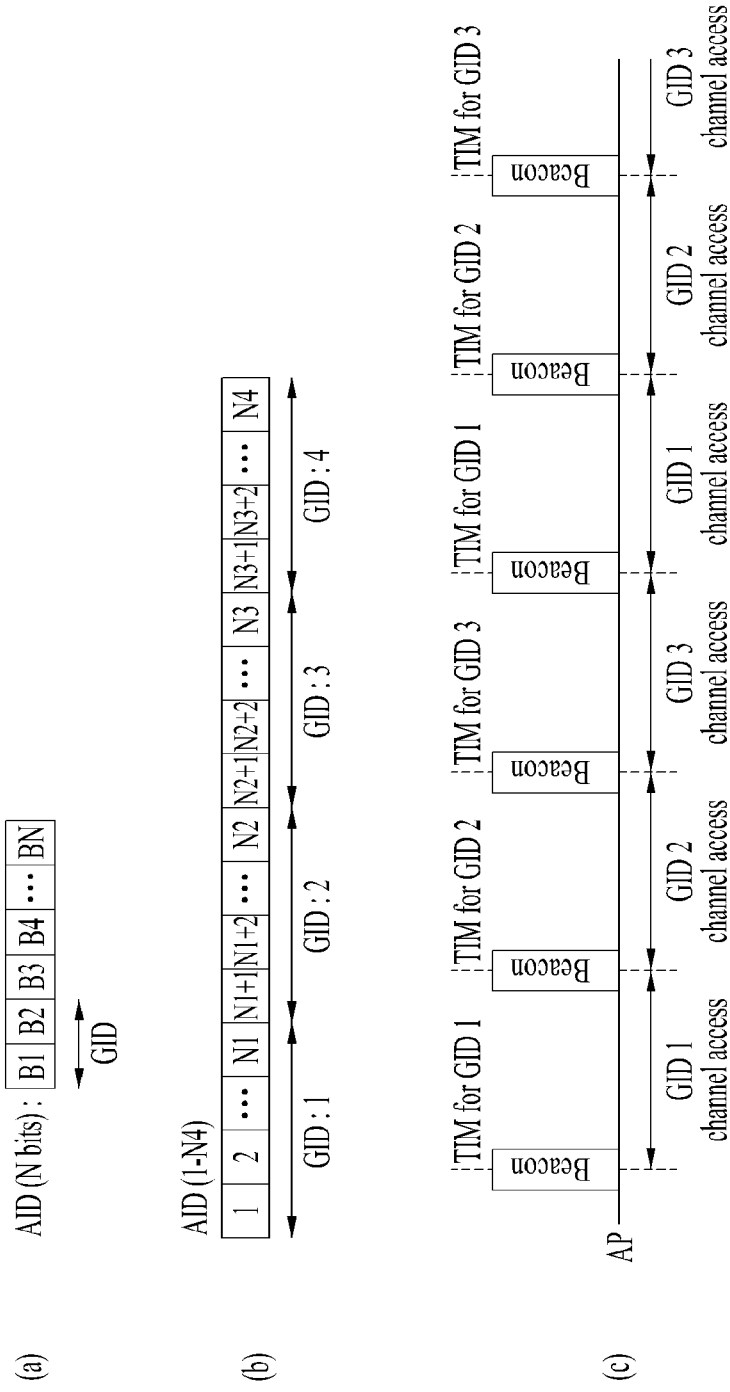
FIG. 13 is a conceptual diagram illustrating a group based AID.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel accessg is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Frame Structure

Figure 14:
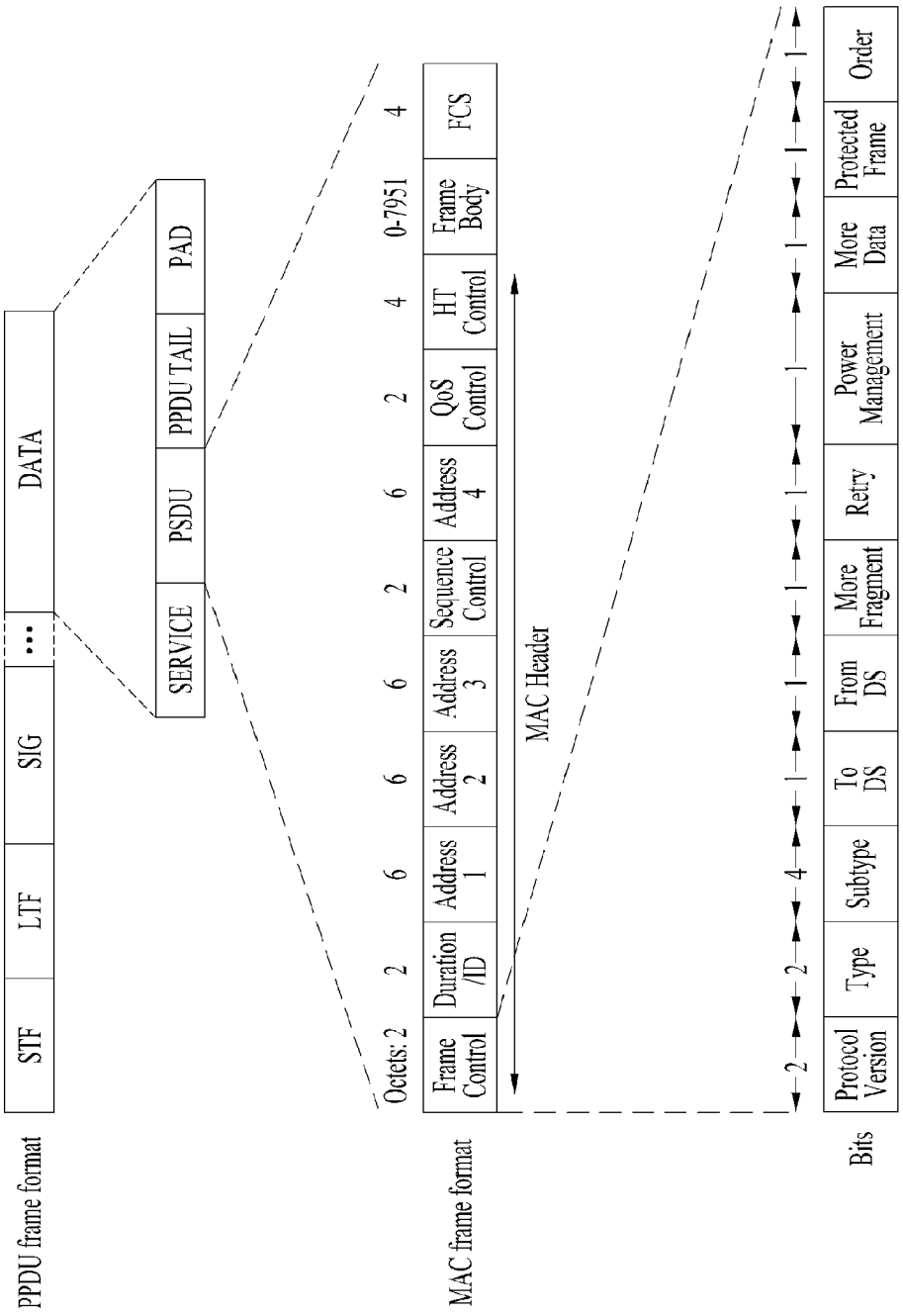
FIG. 14 is a conceptual diagram illustrating a frame structure for use in IEEE 802.11.

FIG. 14 is a diagram for explaining an exemplary frame format used in 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

A MAC header may include a frame control field, a Duration/ID field, an address field, etc. The frame control field may include control information requisite for frame transmission/reception. The Duration/ID field may be established as a specific time for transmitting the corresponding frame or the like. For a detailed description of Sequence Control, QoS Control, and HT Control sub-fields of the MAC header reference may be made to the IEEE 802.11-2012 standard documentation.

The frame control field of the MAC header may include Protocol Version, Type, Subtype, To DS, From DS, More Fragment, Retry, Power Management, More Data, Protected Frame, and Order sub-fields. For a detailed description of individual sub-fields of the frame control field may be made to the IEEE 802.11-2012 standard documentation.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

APSD Mechanism

An Access Point (AP) supporting Automatic Power Save Delivery (APSD) may perform signaling of information indicating that the AP supports APSD using an APSD subfield contained in a capability information field such as a beacon frame, a probe response frame, or associated response frame (or re-associated response frame). The STA capable of supporting APSD may indicate whether to operate in the active mode or in the PS mode using the power management field contained in the FC field of the frame.

The APSD is a mechanism in which the STA operating in the PS mode can transmit DL data and a bufferable management frame. A power management bit of the FC bit of a frame transmitted by the STA operating in the PS mode employing the APSD is set to 1, such that AP buffering may be triggered.

The APSD defines two delivery mechanisms, i.e., Unscheduled-APSD (U-APSD) and Scheduled-APSD (S-APSD). The STA may use the U-APSD in such a manner that all or some parts of a Bufferable Unit (BU) can be transferred during an unscheduled service period (SP). In addition, the STA may use the S-APSD to deliver some or all parts of the BU during the scheduled SP.

In accordance with the U-APSD mechanism, the STA may inform the AP of a requested transmission duration so as to use U-APSD SP, and the AP may transmit a frame to the STA during the SP. In accordance with the U-APSD mechanism, the SSTA may simultaneously receive several PDSUs from the AP using its own SP.

The STA can recognize the presence of data to be received from the AP through a TIM element of a beacon. Thereafter, the STA transmits a trigger frame to the AP at a desired time so as to inform the AP of the beginning of STA's SP, such that the STA may transmit a data transmission request to the AP. The AP may transmit ACK as a response to the trigger frame. Thereafter, the AP transmits an RTS to the STA through competition, receives a CTS frame from the STA, and transmits data to the STA. In this case, data transferred from the AP may be comprised of one or more data frames. When the AP transmits the last data frame, End Of Service Period (EOSP) of the corresponding data frame is set to 1 and is then transmitted to the STA, the STA may recognize the EOSP of 1 and terminate the SP. Therefore, the STA may transmit an ACK signal indicating successful data reception to the AP. As described above, according to the U-APSD mechanism, the STA may start its own SP at a desired time so as to receive data, and receive multiple data frames within one SP, such that it can more effectively receive data.

The STA configured to use U-APSD may not receive a frame transmitted by the AP during the service period (SP) due to interference. Although the AP may not detect interference, the AP may decide that the STA has incorrectly received the frame. Using U-APSD coexistence capability, the STA may inform the AP of a requested transmission duration, and may use the requested transmission duration as an SP for U-APSD. The AP may transmit the frame during the SP, such that the possibility of receiving the frame can increase under the condition that the STA receives interference. In addition, U-APSD may reduce the possibility that the frame transferred from the AP is not successfully received during the SP.

The STA may transmit an ADDTS (Add Traffic Stream) request frame including a coexistence element to the AP. The U-APSD coexistence element may include information regarding the requested SP.

The AP may process a requested SP and transmit the ADDTS response frame as a response to the ADDTS request frame. The ADDTS request frame may include a status code. The status code may indicate response information of the requested SP. The status code may indicate whether or not the requested SP is allowed, and may further indicate a reason of rejection when the requested SP is rejected.

If the requested SP is allowed by the AP, the AP may transmit the frame to the STA during the SP. The duration time of SP may be specified by the U-APSD coexistence element contained in the ADDTS request frame. The beginning point of SP may be a specific time at which the STA transmits a trigger frame to the AP such that the AP is normally received.

The STA may enter a sleep state (or doze status) when U-APSD SP expires.

EDCA Parameter

EDCA parameter may include necessary information for enabling the STA to properly operate according to QoS characteristics during a contention period (CP). In order to establish or change a policy by the AP when a new STA is received or a new traffic starts, the EDCA parameter set IE may be applied to the STA. The STA may update an appropriate Management Information Base (MIB) value according to the latest received EDCA parameter set IE.

The EDCA parameter set IE may include an access category (AC) value to be applied to the STA. The AC may refer to a priority level in EDCA. In more detail, a label of the set of parameters configured to perform channel access competition so as to transmit data (for example, MSDU) according to a predetermined priority is referred to as 'AC'. For example, the AC may be classified into AC_BK(Background), AC_BE(Best Effort), AC_VI(Video), AC_VO (Voice), etc. The ascending numerical order of priorities is AC_BK→AC_BE→AC_VI→AC_VO. That is, AC_BK has the lowest priority, and AC_VO has the highest priority. Traffic having a high AC (or high priority) may be transmitted at a higher probability as compared to other traffic having a low AC (or low priority). For example, the STA having higher-priority traffic is in the standby mode for a shorter time, on average, so as to transmit many more packets than the STA having lower-priority traffic. For example, the STA having higher-priority traffic is in the standby mode for a shorter time, on average, so as to transmit many more packets as compared to another STA having lower-priority traffic.

In addition, the EDCA parameter set IE may include associated information (for example, CWmin and CWmax for specifying the range of a contention window (CW)) regarding a time period to which a specific AC is applied.

PS-Poll Transmission Method

As can be seen from FIGS. 10 and 11, the STA configured to operate on the basis of a TIM may confirm whether a buffered frame to be received by the STA is contained in the AP using a TIM element obtained through the beacon frame, etc. The STA may transmit the PS-Poll frame to the AP so as to receive the buffered frame, and may transmit the ACK frame or the buffered frame to the STA in response to the PS-Poll frame.

If a large number of STAs receiving the buffered frame are present, many STAs may simultaneously transmit the PS-Poll frame. The STA having confirmed the TIM of the beacon frame may transmit the PS-Poll frame within the beacon interval. If the number of STAs transmitting the PS-Poll frame increases during the beacon interval corresponding to a given time length, there is a high possibility of collision between the PS-Poll frames. On the other hand, if AC of the STA is set to AC_BE, the STA having AC_BE is in the standby mode for a longer time (i.e., backs off for a longer time) before frame transmission as compared to other STAs having AC_VI or AC_VO, such that frame transmission of many STAs may reduce the probability of causing overlap between timing points of frame transmission. Accordingly, the PS-Poll frame has been defined to be transmitted using 'AC_BE'.

If channel access priority of the PS-Poll frame is set to AC_BE, the possibility of causing collision can be reduced whereas STA power consumption caused by the increased backoff time unavoidably increases. Accordingly, there is a need to increase channel access priority of the PS-Poll frame so as to reduce STA power consumption. However, the legacy EDCA operation cannot separately allocate the channel access priority (AC) other than AC_BE to a control frame such as a PS-Poll frame.

The present invention provides a method for separately (or adaptively) establishing an AC applied to the PS-Poll frame. For example, while AC_BE is applied to the PS-Poll frame in a general case, a higher channel access priority (for example, AC_VO) may be used at a low possibility of causing collision between PS-Poll frames. The case in which the possibility of causing collision between the PS-Poll frames is not high is classified into two cases. One case may indicate PS-Poll frame transmission of a non-TIM STA, and the other case may indicate that RAW for TIM STA is established.

Non-TIM STA is an STA capable of operating without receiving a TIM from the AP (without receiving a beacon frame from the AP). For example, a low-power STA configured to operate in an application network such as a sensor, a smart grid, an M2M, an Internet of things, or the like, may operate in the non-TIM mode. It is next to impossible for the STA operating in a sleep mode for a long period of time to correctly estimate a beacon transmission time (i.e., target beacon transmission time (TBTT)) from the AP due to the influence of clock drift and the like, such that the STAs need to operate without receiving the beacon. Accordingly, the non-TIM STA awakes from the sleep mode at an arbitrary time without receiving the beacon, a PS-Poll is sent to the AP (where, the PS-Poll may be referred to as an active Poll distinguished from another PS-Poll sent from the legacy TIM STA), such that the non-TIM STA can confirm the presence or absence of a buffered frame to be received by the non-TIM STA. Alternatively, the non-TIM STA awakes at a specific time (for example, a target wake time (TWT)) decided by consultation with the AP, and transmits the PS-Poll frame to the AP, such that the non-TIM STA can recognize the presence or absence of a buffered frame to be received by the non-TIM STA.

As described above, assuming that transmission of the PS-Poll frame is not based on information indicated by the TIM element (or PS-Poll frame transmission is not triggered by the TIM element), PS-Poll frame transmission time points of respective STAs may be distributed at random. Accordingly, although there are a large number of STAs transmitting the PS-Poll frame, the possibility of collision between the PS-Poll frames is not high in the non-TIM STA. Therefore, assuming that the channel access priority of the non-TIM STA is assigned higher priority (e.g., AC_VO) instead of AC_BE, power consumption of the non-TIM STA can be greatly reduced. As a result, a default value of the access category used for PS-Poll frame transmission of the non-TIM STA may be set to AC_VO.

If RAW is established in TIM STA, AC for PS-Poll frame transmission of the TIM STA may be established. TIM STA may confirm a TIM element contained in the beacon frame received from the AP. If the buffered frame exists, the PS-Poll receiving the buffered frame may be transmitted to the AP. If there are a large number of STAs indicated by the TIM element indicating the presence of a buffered frame, there is a high possibility that STAs can simultaneously transmit the PS-Poll frame. In order to avoid simultaneous transmission of the PS-Poll frames, PS-Poll transmission time points may be distributed through the same random variable as a bitmap position value of STAs in the TIM element. For example, the AP may establish a RAW period through the beacon frame.

Figure 15:
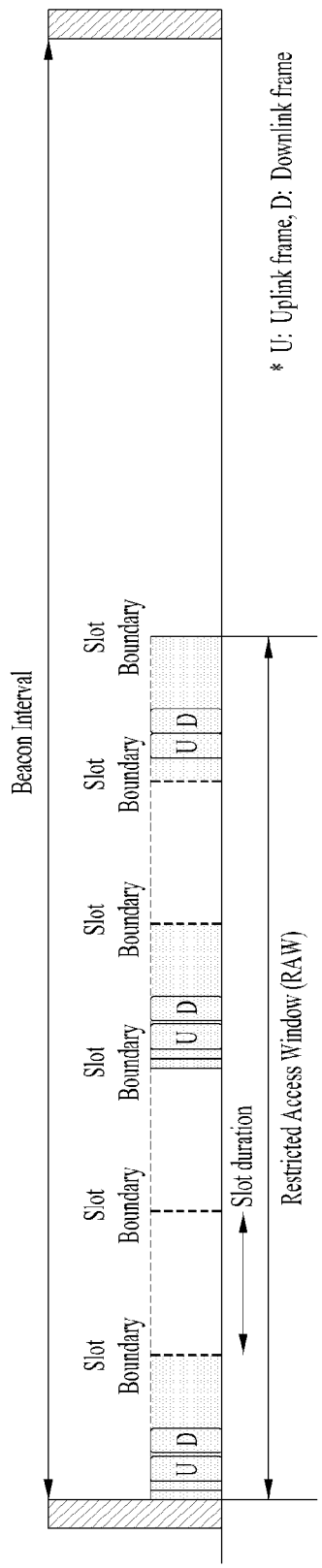
FIG. 15 is a conceptual diagram illustrating a Restricted Access Window (RAW) structure according to one example of the present invention.

FIG. 15 is a conceptual diagram illustrating a Restricted Access Window (RAW) structure according to one example of the present invention.

RAW may be defined as a time period in which access of the STA group is restrictively allowed. For example, STAs corresponding to an AID of a specific range may construct a single RAW group. One RAW may be specified according to a RAW start time and a RAW duration. In addition, RAW may be composed of one or more slots. If one RAW includes a plurality of slots, durations of slots may have the same values. In FIG. 15, 6 slots are defined per RAW duration, and durations of the 6 slots are set to the same value. In FIG. 15, a slot boundary may indicate a reference point for discriminating among contiguous slots.

If RAW is established as described above, only STA(s) to which channel access is permitted by the AP can perform channel access. STAs configured to receive the beacon frame and confirm the TIM element can recognize the presence or absence of a buffered frame. The STA that allows the AP to receive the buffered frame can transmit the PS-Poll frame to the AP. If RAW is configured in STAs, PS-Poll frame transmission of a specific STA is allowed only within a specific slot of the corresponding RAW. For this purpose, RAW configuration may include slot assignment information. In this case, the slot assignment uses the same random variable as the bitmap position value of STAs in the TIM element, such that there is a relatively low possibility of generating collision between PS-Poll frame transmissions of STAs assigned the same RAW.

Therefore, if the channel access priority (or AC) applied to the PS-Poll frame transmitted from the STA within the RAW period is assigned a high value (e.g., AC_VO) higher than the legacy AC_BE, STA power consumption can be greatly reduced. Therefore, a default value of the access category used for PS-Poll frame transmission within the RAW period may be set to AC_VO.

In addition, assuming that the AP desires to change the AC used for PS-Poll frame transmission of the STAs, a method for establishing the PS-Poll access category through a beacon frame, a probe response frame, and an associated response frame (or re-associated response frame) is proposed. For this purpose, a new field contained in the beacon frame or the like may be defined. For example, 2 bits from among reserved bits of the Extended Capability IE are defined as a PS-Poll AC field, and the AC value used for PS-Poll frame transmission may be transferred to the STA using the PS-Poll AC field. Alternatively, instead of using some bits of the legacy Extended Capability IE field, a new IE is defined as shown in FIG. 16 and an AC for the PS-Poll frame may be separately applied to the STA as necessary.

FIG. 16 is a structural diagram illustrating an Information Element (IE) used for establishing the PS-Poll AC according to the present invention.

Referring to FIG. 16(a), Element ID may be assigned a specific value indicating that the corresponding IF is an IE for the PS-Poll AC. A Length field may be assigned a specific value indicating the length of a PS-Poll AC field. A PS-Poll Access Category field may be assigned an AC value to be used for PS-Poll frame transmission.

For example, PS-Poll AC information may be transferred from the AP to the STA through the beacon frame. Although the non-TIM STA operates without confirming a TIM contained in the beacon frame, the PS-Poll AC information proposed by the present invention may be transferred from the AP to the STA through two steps requisite for recognizing basic AP operation information. In more detail, a first step of the two steps allows the STA to discover the AP, and a second step of the two steps allows the STA to associate with the AP. Accordingly, an AC of the PS-Poll frame may be applied to the STA according to the AC value established by the AP. For example, the AC value used for PS-Poll transmission of the non-TIM STA may be set to AC_VO through the PS-Poll AC field contained in the beacon frame. Alternatively, if the AC value applied to PS-Poll transmission of the non-TIM STA is set to a default AC_VO, a different value may be assigned to the PS-Poll AC.

In addition, the AC value used for PS-Poll frame transmission is indicated, such that the corresponding AC may provide a time interval or scheduling information to be applied to PS-Poll frame transmission. For example, FIG. 16(b) may further include a duration field and an interval field as compared to FIG. 16(a). The duration field may be set to a specific value indicating a time duration to Which the PS-Poll AC established by AP is applied. That is, the PS-Poll frame transmitted during a specific time corresponding to a specific value indicated by the duration field may be based on priority of the AC value established by the PS-Poll AC field. The interval field may be set to a specific value indicating a time interval in which the AC used for PS-Poll frame transmission is changed. For example, the PS-Poll AC value established by the AP may be applied to a predetermined time duration repeated at intervals of a predetermined time.

PS-Poll Response Method

Long sleeper STAs may refer to STAs capable of maintaining the sleep mode (or doze mode) for a long period of time. Long sleeper STAs awake at a predetermined time (e.g., target wake time (TWT)) allocated by the AP, and transmit the PS-Poll frame. Alternatively, the long sleeper STAs are synchronized with the AP upon receiving the beacon frame, and can confirm the presence or absence of a buffered frame to be received. If the sleep duration of the long sleeper STAs is elongated, an error of a local clock (or local timer) of the STA increases, such that it is difficult to correctly estimate a TBTT (Target Beacon Transmit Time). Therefore, long sleeper STAs awake at an arbitrary time point, transmit a short control frame such as the PS-Poll frame to the AP so as to establish synchronization with the AP, and confirm the presence or absence of a buffered frame to be received by each long sleeper STA, resulting in higher efficiency in terms of energy consumption.

The non-TIM STA from among long sleeper STAs is restricted to an STA that does not receive signaling information (e.g., a TIM element) indicating a buffered frame from the AP. That is, the non-TIM STA may operate without receiving the beacon frame from the AP. If a Timing Synchronization Function (TSF) error between the STA and the AP occurs for 100 ms or longer, it is next to impossible for the corresponding STA to estimate a beacon transmission time (i.e., TBTT) of the AP. Instead of reception of the beacon frame, non-TIM STAs awake at an arbitrary time and transmit the PS-Poll frame to the AP, such that each non-TIM STA may recognize the presence or absence of a buffered frame to be received by the non-TIM STA.

If the non-TIM STAs awake at an arbitrary time and transmit the PS-Poll, trigger frame, or UL data frame, the corresponding transmission start time overlaps with those of legacy communication standards, resulting in the occurrence of interference or collision.

FIG. 17 is a conceptual diagram illustrating a PS-Poll response method according to one example of the present invention.

Referring to FIG. 17, it is assumed that STA1 is denoted by a non-TIM STA, and BSS1 of AP1 is contiguous to or overlaps with BSS2 of AP2. In addition, STA1 is associated with AP1 and STA2 is associated with AP2. In addition, it is assumed that the relationship between STA1 and STA2 is a hidden node. That is, a hidden node of STA1 is an STA2, and a hidden node of STA2 is an STA1, such that STA1 cannot listen to transmission information of the STA2, and STA2 cannot listen to transmission information of the STA1.

In FIG. 17(a), we assume that, before the non-TIM STA (i.e., STA1) awakes, another STA (i.e., STA2) acquires a transmission opportunity (TXOP) through channel access. In this case, STA2 may belong to a BSS (OBSS) overlapped with a BSS of STA1, or may perform communication between one STA and another STA (i.e., STA3) (where, AP2 of FIG. 17 may be replaced with STA3). When STA2 establishes the TXOP, a time period corresponding to a NAV of peripheral AP(s) (including AP1 connected to the non-TIM STA) may be set to TXOP duration through the RTS/CTS process associated with AP2.

If STA1 is a hidden node incapable of listening to communication information of STA2, STA1 cannot recognize channel access of STA2, so that it determines an idle status of a channel and transmits the PS-Poll frame to AP1. That is, after STA1 performs backoff through EDCA, STA1 may transmit the PS-Poll frame to the AP. If the AP having received the PS-Poll frame answers the ACK frame without confirming its own channel state, the corresponding ACK frame may cause interference or collision to legacy communication (e.g., communication between STA2 and AP2).

In order to solve the above-mentioned problem, the present invention provides a method for enabling the AP having received the PS-Poll frame to check a channel state thereof before transmitting a response frame (e.g., ACK frame or data frame) to the STA.

The example of FIG. 17(b) assumes the presence of a peripheral situation similar to FIG. 17(a). That is, if STA1 incapable of listening to communication between STA2 and AP2 transmits the PS-Poll frame to AP1, the AP1 may confirm a channel state thereof before transmitting a frame answering the PS-Poll frame of the STA1. The AP1 in which NAV is established by channel access between STA2 and AP2 can recognize that a channel is occupied during the NAV period, such that the AP1 need not transmit a response frame to STA1. Accordingly, channel access of another STA can be protected.

In accordance with the proposal of the present invention, if the AP receives the PS-Poll frame from the STA, the AP can operate as follows in consideration of the non-TIM STAs.

If the AP receives the PS-Poll frame from the STA, the AP may determine whether an AID value of the STA contained in the PS-Poll frame belongs to the Aid range allocated to the non-TIM STAs.

If the PS-Poll frame receives the non-TIM STA, the AP may recognize a channel state thereof before the ACK frame or the buffered DATA frame is transmitted to the corresponding STA.

If NAV is not established (or if a channel is in an idle mode) after reception of the PS-Poll frame, the AP may transmit the ACK frame or the buffered frame to the STA.

If the AP always performs physical carrier sensing, the AP may generate a response signal using the ACK frame or the buffered DATA frame according to the physical carrier sense result obtained before reception of the PS-Poll frame. That is, if the physical carrier sense result of a primary channel is in the idle state prior to reception of the PS-Poll frame, the AP may transmit the ACK frame or the buffered DATA frame to the STA.

Information as to which one of the ACK frame or the buffered DATA frame will be used for such answering may be changed according to the implementation scheme of an AP processing throughput, etc. If the buffered DATA frame can be immediately transmitted within a predetermined time (e.g., SIFS) after the AP receives the PS-Poll frame, the AP may generate a response signal using the buffered DATA frame. Alternatively, if the AP cannot transmit the buffered DATA frame within a predetermined time, the AP may generate a response signal using the ACK frame.

On the other hand, if the AID value of the STA contained in the PS-Poll frame is not contained within the AID range allocated to the non-TIM STAs, the AP need not confirm a channel status thereof when generating a response signal using the ACK frame or the buffered DATA frame.

That is, if a general STA (e.g., TIM STA) instead of the non-TIM STA transmits the PS-Poll frame, the AP having successfully received the PS-Poll frame may always transmit the ACK frame or the buffered DATA frame after lapse of SIFS, irrespective of a channel status thereof.

As described above, if the non-TIM STA awakes from the sleep mode and transmits the PS-Poll frame, there is a high possibility that the non-TIM STA is not synchronized with the AP. Accordingly, after the non-TIM STA confirms a channel status when answering the PS-Poll frame, the AP transmits the ACK frame or the buffered data frame, such that channel access of another STA can be protected.

For example, an STA that is addressed by an PS-Poll frame shall transmit either an ACK frame or Buffered DATA/Management frame after an SIFS period if the NAV at the STA receiving the PS-Poll frame indicates that the medium is idle. If the NAV at the STA receiving the PS-Poll frame indicates the medium is not idle, that STA shall not respond to PS-Poll frame.

FIG. 18 is a conceptual diagram illustrating a PS-Poll response method according to another example of the present invention.

Referring to FIG. 18, the AP having received the PS-Poll frame (from the non-TIM STA) may determine whether a channel state checking (e.g., NAV confirmation) operation is carried out according to response types.

In the case of the NDP ACK frame, message information associated with the ACK frame is not contained in a PDSU and is contained in a PHY layer field (e.g., PLCP header part (e.g., STF, LTF, and SIG fields). If the ND PACK frame is transmitted as a response frame of the PS-Poll frame, the AP does not confirm a channel state before transmitting a response to the PS-Poll frame, because the NDP ACK frame has a very short length corresponding to the length of several OFDM symbols such that a time or influence causing interference to other STA/AP communication is very short.

The NDP ACK frame is comprised of only STF, LTF and SIG fields. A channel estimation sequence for decoding the SIG field may be contained in the STF and LTF fields. Message information associated with the ACK frame may be contained in the SIG field. ACK-frame associated message information contained in the SIG field may include a More Data bit indicating whether or not a. Receiver Address and a buffered frame to be received by the corresponding STA are contained in the AP.

The AP need not confirm channel states of a plurality of frames before answering the PS-Poll frame. For example, the plurality of frames may include an NDP ACK frame, a normal ACK frame, an RTS frame, a CTS frame, etc.

That is, assuming that the AP receives the PS-Poll frame and is ready to transmit not only the NDP ACK frame as a response to the PS-Poll frame, but also control frames (such as normal ACK frame, RTS frame, and CTS frame), the AP may transmit the corresponding response frame without confirming whether its own channel state (e.g., NAV value) is a busy or idle state.

Alternatively, assuming that the buffered DATA frame used as a response to the PS-Poll frame is transmitted to the AP, the AP confirms its own channel state (e.g., NAV value) before transmitting the DATA frame, such that it can transmit a response frame only in the idle state.

Before the AP receives the PS-Poll frame and transmits a response frame, the AP may recognize its own channel state (e.g., NAV value) using some kinds of frame types. For example, the above frame types may be restricted to a DATA frame, a management frame, etc.

Alternatively, it may be determined whether the AP confirms a channel status before transmission of a response frame on the basis of a transmission (Tx) time of a response frame or the size (e.g., the number of bytes or the number of octets) of the response frame.

If the AP receives the PS-Poll frame and the Tx time or size of a response frame used as a response to the PS-Poll frame is equal to or higher than a predetermined threshold value, the AP may confirm its own channel state (e.g., NAV value) before transmitting the corresponding response frame. Alternatively, if the Tx time or size of the response frame is less than the predetermined threshold value, the AP may not confirm its own channel status before transmitting the corresponding response frame.

FIG. 18(*a*) shows that AP1 having received the PS-Poll frame from STA1 (i.e., non-TIM STA) desires to generate a response signal using the ACK frame. If the response frame type is an ACK frame, AP1 may transmit the ACK frame without confirming the NAV value. Alternatively, AP1 confirms its own NAV value, such that it can transmit the ACK frame even though a channel (or medium) is in a busy state due to communication between STA2 and AP2.

FIG. 18(*b*) shows that the AP1 having received the PS-Poll frame from STA1 (i.e., non-TIM STA) desires to generate a response signal using the buffered DATA frame. If the response frame type is a DATA frame, AP1 confirms its own NAV value, such that the AP1 may transmit a response frame (e.g., DATA frame) only when a channel (or medium) is in an idle mode. The example of FIG. 18(*b*) shows that a response frame type is a DATA frame and the NAV value of the AP1 indicates a channel busy state, such that AP1 may not transmit the DATA frame.

As described above, assuming that the AP may or may not confirm the channel status according to response frame types, if the AP receives the PS-Poll frame and a channel state of the AP is not idle, only the deferred PS-Poll procedure (i.e., the ACK frame is first transmitted in response to the PS-Poll frame and the DATA frame is then transmitted) instead of the immediate PS-Poll procedure (i.e., the DATA frame is immediately transmitted in response to the PS-Poll frame) may be selected as necessary.

In other words, if the AP channel state is not idle (e.g., if the NAV value indicates a channel busy state), a response frame of the PS-Poll frame may not be used as the DATA frame. In this case, the AP first transmits the ACK frame instead of the DATA frame, informs the STA of whether the PS-Poll frame has been successfully received by the AP, and at the same time informs the STA of whether the DATA frame to be received by the corresponding STA is buffered by the AP.

The AP channel state is not in the idle mode. Assuming that a response to the PS-Poll frame is used for the ACK frame but not the DATA frame, the corresponding ACK frame may further include information of a timing point at which the AP can deliver the DATA frame. The timing information may be denoted by a time offset value.

For example, the AP can immediately generate a response signal using the DATA frame upon receiving the PS-Poll frame from the STA. However, assuming that the AP first transmits the ACK frame under a channel busy state, the ACK frame may include a duration value of a NAV established in the AP or other values in the time offset value.

The non-TIM STA having received the ACK frame including the time offset value as a response to the PS-Poll frame operates in the sleep mode during a time offset, awakes from the sleep mode at a specific time specified by the time offset, and then receives the buffered frame from the AP.

Figure 19:
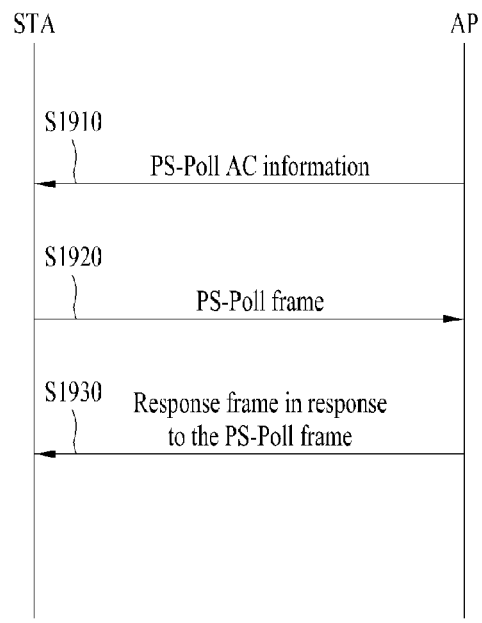
FIG. 19 is a flowchart illustrating the PS-Poll process according to one example of the present invention.

FIG. 19 is a flowchart illustrating the PS-Poll process according to one example of the present invention.

Referring to FIG. 19, an STA may receive PS-Poll access category (AC) information from an AP in step S1910. The PS-Poll AC field may be provided to the STA through a beacon frame.

The STA may transmit the PS-Poll frame to the AP in step S1920. In step S1920, the STA may transmit the PS-Poll frame using the PS-Poll AC shown in step S1910. In this case, the STA does not confirm a TIM provided through the beacon frame, and may be a non-TIM STA configured to transmit the PS-Poll frame at a time point at which the STA awakes. In this case, a time point (or a specific time at which a non-TIM STA awakes) at which the non-TIM STA transmits the PS-Poll frame may be allocated or established by the AP.

In step S1930, the STA may receive a response frame (e.g., ACK frame, buffered DATA frame, etc.) to the PS-Poll frame from the AP. In this case, the AP may confirm a channel status (or its own NAV value) before transmitting a response frame of the PS-Poll frame. Alternatively, whether to perform the operation for confirming the channel state may be decided according to response frame types of the PS-Poll frame.

PS-Poll transmission/reception and the method for transmitting and receiving the PS-Poll response frame according to the embodiment shown in FIG. 19 may be implemented such that the above described various embodiments of the present invention may be independently applied or two or more embodiments thereof may be simultaneously applied.

Figure 20:
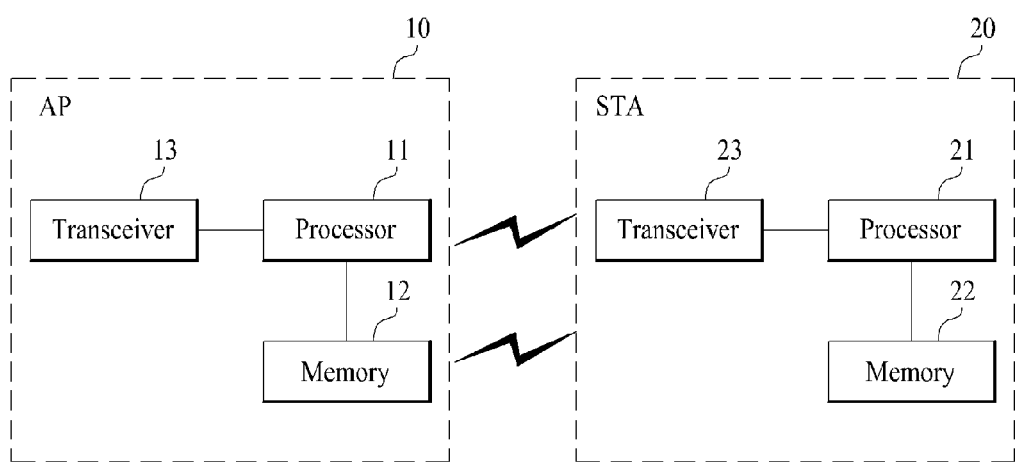
FIG. 20 is a block diagram illustrating a radio frequency (RF) device according to one embodiment of the present invention.

FIG. 20 is a block diagram illustrating a radio frequency (RF) device according to one embodiment of the present invention.

Referring to FIG. 20, an AP 10 may include a processor 11, a memory 12, and a transceiver 13. An STA 20 may include a processor 21, a memory 22, and a transceiver 23. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 may be configured to operate according to the above described various embodiments of the present invention. Modules for implementing operation of the AP and STA according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

The AP 10 shown in FIG. 10 may support frame transmission (in more detail, PS-Poll frame transmission) of the STA 20. The processor 11 awakes at a predetermined time, and enables the AP 10 to receive the PS-Poll frame from the STA 20 using the transceiver 13. In addition, the processor 11 may enable the AP 10 to transmit response information of the PS-Poll frame to the STA 20 using the transceiver 13. Here, specific information indicating the access category (AC) of the PS-Poll frame is transferred from the AP 10 to the STA 20, and the STA 20 may transmit the PS-Poll according to the indicated PS-Poll access category (AC).

The STA 20 shown in FIG. 20 may be configured to perform frame transmission (in more detail, PS-Poll frame transmission). The processor 21 awakes at a predetermined time, and enables the STA 20 to transmit the PS-Poll frame to the AP 10 using the transceiver 23. In addition, the processor 11 may enable the AP 10 to transmit response information of the PS-Poll frame to the STA 20 using the transceiver 13. In addition, the processor 21 may enable the STA 20 to receive response information of the PS-Poll frame from the STA 20 using the transceiver 23. Here, specific information indicating the access category (AC) of the PS-Poll frame is transferred from the AP 10 to the STA 20, and the STA 20 may transmit the PS-Poll frame according to the indicated PS-Poll access category (AC).

In addition, the AP 10 may confirm a channel status before a response to the PS-Poll is transferred from the STA 20, may determine whether to confirm a channel status according to response types, and may operate according to the determined result.

The overall configuration of the AP 10 and the STA 20 shown in FIG. 20 may be implemented such that the above described various embodiments of the present invention may be independently applied or two or more embodiments thereof may be simultaneously applied and a repeated description thereof is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based upon an IEEE 802.11 system, the embodiments may be applied in the same manner to various mobile communication systems.

The invention claimed is:

1. A method for transmitting a frame by a first type station (STA) in a wireless LAN (WLAN) system, the method comprising:
receiving an information element from an access point (AP),
wherein the information element includes a Power Save (PS)-Poll Access Category (AC) field indicating an AC of a PS-Poll frame to be transmitted by the first type STA,
wherein the PS-Poll AC field of the information element is reserved for a second type STA,
wherein the first type STA is a STA to which at least one of a non-TIM (Traffic Indication Map) operation and a RAW (Restricted Access Window) operation can be applied, wherein the second type STA is a STA to which the non-TIM operation and the RAW operation cannot be applied,
wherein the non-TIM operation is an operation for the first type STA to:
not listen for a TIM element from the AP, and
transmit a PS-Poll frame to the AP,
wherein the RAW operation is an operation for the AP to allocate a RAW to a limited number of the first type STAs to spread an uplink access of the first type STA,
wherein information on the PS-Poll AC field can indicate an AC other than an Access Category-Best Effort (AC_BE) while a transmission of a PS-Poll frame by the second type STA is predetermined as using only the AC_BE to reduce collision probability;
transmitting, by the first type STA, the PS-Poll frame to the AP according to information on the PS-Poll AC field; and
receiving a response in response to the PS-Poll frame from the AP by the first type STA.

2. The method according to claim 1, wherein the information on the PS-Poll AC field includes an AC field applied to the PS-Poll frame to be transmitted within the RAW.

3. The method according to claim 2, wherein the AC field is used for the AP to inform the first type STA of an access category for transmitting the PS-Poll frame in the RAW.

4. The method according to claim 1, wherein the information element is included in a beacon frame.

5. The method according to claim 1, wherein the PS-Poll AC field is two bits long.

6. The method according to claim 1, wherein the transmission of the PS-Poll frame by the first type STA is performed with a backoff procedure for accessing a wireless medium in the RAW using the access category corresponding to a specific value set by the PS-Poll AC field.

7. The method according to claim 1, wherein the first type STA is a non-TIM STA.

8. A method for supporting transmission of a first type station (STA) by an access point (AP) in a wireless LAN (WLAN) system, the method comprising:
transmitting an information element by the AP,
wherein the information element includes a Power Save (PS)-Poll Access Category (AC) field indicating an AC of a PS-Poll frame to be transmitted by the first type STA,
wherein the PS-Poll AC field of the information element is reserved for a second type STA,
wherein the first type STA is a STA to which at least one of a non-TIM (Traffic Indication Map) operation and a RAW (Restricted Access Window) operation can be applied,
wherein the second type STA is a STA to which the non-TIM operation and the RAW operation cannot be applied,
wherein the non-TIM operation is an operation for the first type STA to:
not listen for a TIM element from the AP, and
transmit a PS-Poll frame to the AP,
wherein the RAW operation is an operation for the AP to allocate a RAW to a limited number of the first type STAs to spread an uplink access of the first type STA,
wherein information on the PS-Poll AC field can indicate an AC other than an Access Category-Best Effort (AC_BE) while a transmission of a PS-Poll frame by the second type STA is predetermined as using only the AC_BE to reduce collision probability;
receiving the PS-Poll frame from the first type STA according to information on the PS-Poll AC field; and
transmitting a response in response to the PS-Poll frame to the first type STA,
wherein information indicating an Access Category (AC) of the PS-Poll frame to be transmitted by the first type STA within the RAW is provided from the AP to the first type STA, the first type STA being a STA of which transmission is restricted to a Restricted Access Window (RAW) allocated by the AP.

9. A first type station (STA) device for transmitting a frame in a wireless LAN (WLAN) system, the first type STA comprising:
a transceiver; and
a processor configured to:
receive, using the transceiver, an information element from an access point (AP);
transmit, using the transceiver, a Power Save (PS)-Poll frame to an access point (AP); and
receive, using the transceiver, a response in response to the PS-Poll frame from the AP,
wherein the information element includes a PS-Poll Access Category (AC) field indicating an AC of the PS-Poll frame to be transmitted by the first type STA,
wherein the PS-Poll AC field of the information element is reserved for a second type STA,
wherein the first type STA is a STA to which at least one of a non-TIM (Traffic Indication Map) operation and a RAW (Restricted Access Window) operation can be applied,
wherein the second type STA is a STA to which the non-TIM operation and the RAW operation cannot be applied,
wherein the non-TIM operation is an operation for the first type STA to:
not listen for a TIM element from the AP, and
transmit a PS-Poll frame to the AP,
wherein the RAW operation is an operation for the AP to allocate a RAW to a limited number of the first type STAs to spread an uplink access of the first type STA,
wherein information on the PS-Poll AC field can indicate an AC other than an Access Category-Best Effort (AC_BE) while a transmission of a PS-Poll frame by the second type STA is predetermined as using only the AC_BE to reduce collision probability.

10. An access point (AP) device for supporting transmission of a first type station (STA) in a wireless LAN (WLAN) system, the AP comprising:
a transceiver; and
a processor configured to:
transmit, using the transceiver, an information element;
receive, using the transceiver, a Power Save (PS)-Poll frame from the first type STA; and
transmit, using the transceiver, a response information in response to the PS-Poll frame to the first type STA,
wherein the information element includes a PS-Poll Access Category (AC) field indicating an AC of a PS-Poll frame to be transmitted by the first type STA,
wherein the PS-Poll AC field of the information element is reserved for a second type STA,
wherein the first type STA is a STA to which at least one of a non-TIM (Traffic Indication Map) operation and a RAW (Restricted Access Window) operation can be applied, wherein the second type STA is a STA to which the non-TIM operation and the RAW operation cannot be applied, wherein the non-TIM operation is an operation for the first type STA to:
not listen for a TIM element from the AP, and
transmit a PS-Poll frame to the AP, wherein the RAW operation is an operation for the AP to allocate a RAW to a limited number of the first type STAs to spread an uplink access of the first type STA, wherein information on the PS-Poll AC field can indicate an AC other than an Access Category-Best Effort (AC_BE) while a transmission of a PS-Poll frame by the second type STA is predetermined as using only the AC_BE to reduce collision probability.

* * * * *